Nov. 10, 1970   G. E. HUMPHRESS   3,539,988
WARNING LIGHT DEVICE AND THEFT ALARM
Filed April 18, 1967
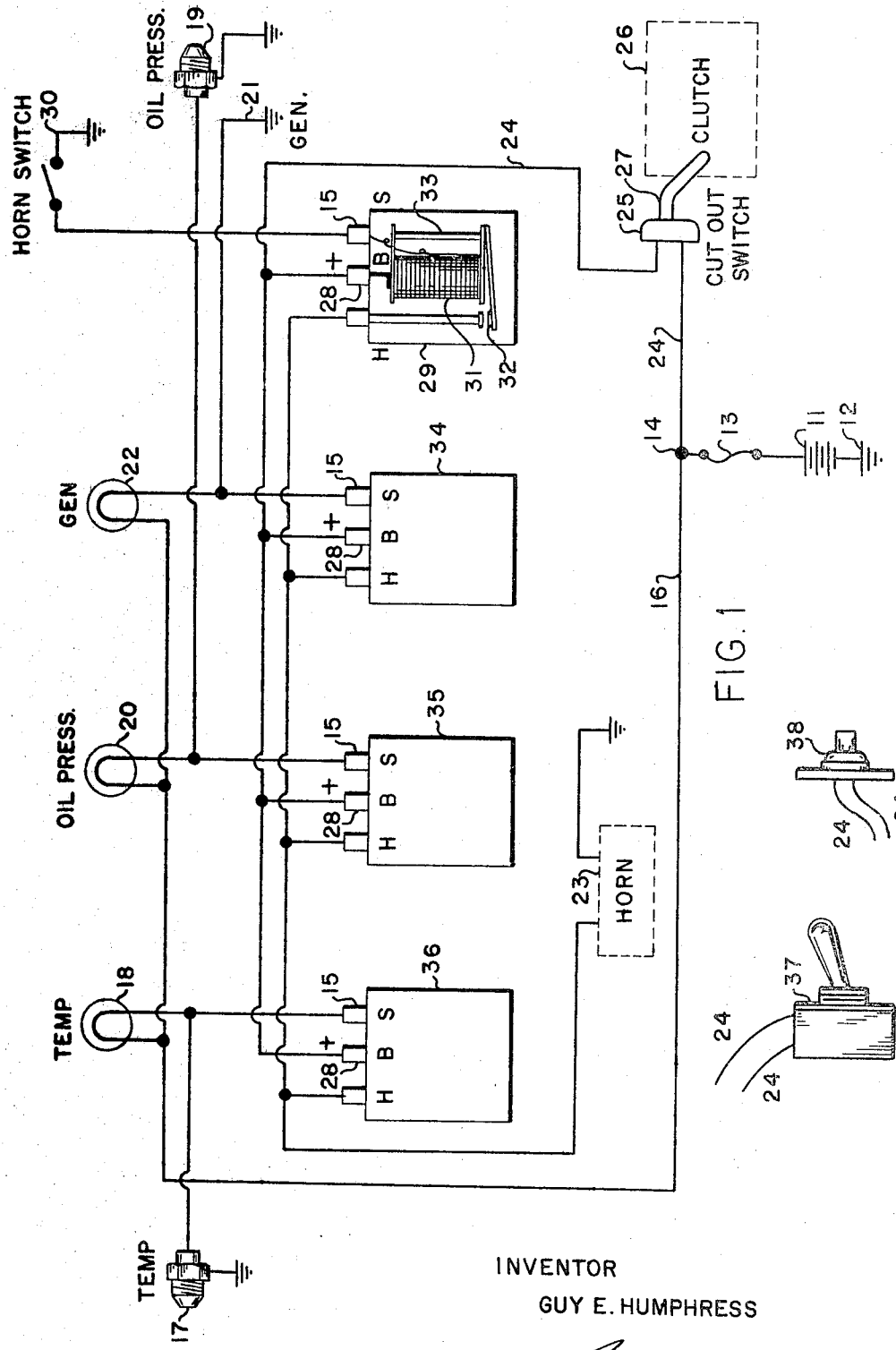
INVENTOR
GUY E. HUMPHRESS
BY
ATTORNEY

United States Patent Office 3,539,988
Patented Nov. 10, 1970

1

3,539,988
WARNING LIGHT DEVICE AND THEFT ALARM
Guy E. Humphress, 106 Greenhaven,
San Antonio, Tex. 78201
Filed Apr. 18, 1967, Ser. No. 631,630
Int. Cl. B60r 25/00; B60q 1/00
U.S. Cl. 340—52                                    7 Claims

ABSTRACT OF THE DISCLOSURE

A warning system for an internal combustion engine vehicle comprising a multiplicity of motor operating conditions sensing units, a corresponding multiplicity of warning lights, and horn relays including an audible alarm interconnected by an above ground wiring harness to a grounded source of electric potential; the wiring circuit so arranged as to sound the alarm if any sensor or portion of the circuit is grounded unless the alarm is deactivated by means of the cutout switch.

---

A sensing device indicating motor operating conditions; dash lights, relays, horn and battery are interconnected in such a manner as to sound the horn in the event during operation generator ceases to charge, oil pressure drops below a safe operating level, or motor temperature becomes excessive, warning the operator of motor's unsafe operating condition. A secondary accomplishment of the combination is to operate the horn if the ignition coil is activated conventionally or directly by a jumper wire accomplishing a theft alarm function. A concealed cut out switch is provided for deactivating the system when owner starts the vehicle.

Some motor vehicles are equipped with gauges visibly indicating the motor operating condition. Such gauges are interconnected to sensing units attached to the motor block by applicable accessories to visibly indicate on the gauge oil pressure, temperature, charge or discharge of the generator, or alternator.

In more recent years warning lights placed on the dash of the vehicle have replaced gauges and in conventional practice a red light will be activated to indicate low oil pressure, excessive temperature, or discharge of the generator.

In motor vehicles equipped with air cooled engines, a red light is activated on the dash when the fan belt breaks and the generator or alternator is no longer operating. Particularly in vehicles equipped with air cooled motors, operation must be ceased or emergency methods of operations initiated if the functioning of the cooling fan is interrupted. The failure of the operator to note the red warning light for even a few minutes will result in an overheating of the engine and too frequently a freezing of the pistons and extensive damage to the motor necessitating costly repairs.

A primary object of this invention is to give the operator immediate obvious audible warning when the cooling fan is no longer operating satisfactorily thereby prompting emergency procedures avoiding serious damage to the motor of the vehicle.

Another object is to warn the operator when oil pressure drops below an acceptable operating level or when the motor operating temperature exceeds acceptable operating conditions.

Another object of the device is to sound the horn should someone attempt to start the vehicle by jumping the ignition or by use of a key when not familiar with the location by the operator of the concealed cut out switch.

Other objects and advantages accomplished will become apparent to one skilled in the art from a study of the following detailed descriptions, drawings, and appended claims.

FIG. 1 is a schematic diagram of the device incorporating a cut out switch operated by fully depressing the clutch of the vehicle.

FIG. 2 illustrates an on off toggle switch which can be substituted for the clutch operated cut out switch.

FIG. 3 is a push button cut out switch which can be concealed and activated by the ash tray, door, or other manual means.

Referring now to the views wherein like reference characters will refer to identical or equivalent components throughout the entire description. Referring to FIG. 1, primarily a schematic diagram illustrating a preferred embodiment invention, a battery 11 with its negative pole grounded 12 provides the electric potential to operate the system. The positive potential of the battery 11 is connected through a fuse 13 by a wiring harness 14 to the various components of the system. The system is so designed that the entire system or any portion thereof is energized by any contact to ground. The switch side of the relay 15 is constantly provided with a positive potential through by-pass line 16; this line also energizes the various sensing devices and warning lights of the system. For example, the temperature sensing unit 17 is so constructed as to normally have an open to ground, a temperature range above aceptable amounts creates a ground completing the circuit lighting the temperature bulb 18. An inadequate oil pressure in the oil sensing unit 19 creates a ground completing the circuit lighting the oil pressure bulb 20 on the dash. A similar action occurs when the generator sensing unit 21 is grounded thereby activating the generator warning light 22 on the dash.

The positive potetial to the horn 23 is supplied through the horn line 24 which feeds through cut out switch 25 illustrated in FIG. 1. In this preferred embodiment, the cut out switch 25 is operated by depressing the clutch 26 of the vehicle substantially to the floor engaging the cut out lever 27 of the switch 25 opening the battery circuit 28 to the various relays. The operation of the relays can best be illustrated by referring to the horn relay 29 illustrated partially in section in FIG. 1. With cutout switch 25 in contact, the positive potential is transmitted through line 24 to the B battery terminal 28 of the relay which creates a potential which is capable of energizing the horn terminal H when the relay is activated. Closing of the horn switch 30 will complete the circuit through the electro magnet 31 which will close the relay points 32 creating a current flow from the battery terminal 28 of the relay through the bridge 33 bypassing the high resistance wiring of the coil of the electro magnet 31 thereby creating a potential through to the horn 23 sounding the horn. The operation of the generator sensing unit 21, the oil pressure sensing unit 19, and the temperature sensing unit 17 is identical with the switching effect of closing the horn switch 30 in so far as the operation of the various relays and sounding of the horn 23 is concerned.

With the cutout switch 25 open, the horn relay 29, generator relay 34, oil pressure relay 35, and temperature relay 36 are deactivated. However, the various sensing units such as the temperature 17 and the temperature warning light 18, oil pressure sensing unit 19, and the oil pressure warning light 20, the generator sensing unit 21, and generator dash light 22 operate and function independent of the current flow through the horn line 24 and the opening and closing of the cutout switch 25. The function of the entire system when the cutout switch is closed and all of the relays energized is to cause any sensing unit or in effect any dash light to operate the horn 23 in the same manner as the closing of the horn switch 30 operating the horn relay 29 completing the circuit through the horn 23. For example, should the temperature sensing unit 17 reach a temperature adequate to create a ground, the effect on the temperature relay 36 would be comparable to the closing of the horn switch 30 completing the circuit and sounding horn 23. Similarly, insufficient oil pressure will ground the oil pressure sensing unit 19 thereby activating the oil pressure relay 35 sounding the horn 23. The breaking of the fan belt on the vehicle would cause the generator to cease charging; such an accident will cause a ground in the generator sensing unit 21 thereby activating the generator relay 34 sounding the horn 23 warning the operator of the failure of the generator to function, and on an air cooled vehicle, the primary though incidental ceasing of proper operation of the cooling fan (not shown) and the imminent danger of engine over heating. A visual warning is given the operator by any of the three (3) dash lights 18, 20, and 22, while simultaneously an audible warning is given on the horn 23.

The burglar alarm effect of the entire system is ancillary to the warning function. The turning on of the ignition switch (not shown) or a hot wiring of the ignition coil (not shown) by means of a jumper wire (not shown) energizes the system through fuze 13. The effect is to sound the horn by any energizing of the wiring harness 14 of the system in order to operate the vehicle if cut out switch 25 is not operated. Any attempt to start the vehicle either by use of the master set of keys or by the common method of jumping the ignition will sound the horn and frighten the thief or attract attention to the vehicle or the attempted theft.

This secondary function of the system prompted the suggested utilization of other types of cutout switches illustrated in FIG. 2 and FIG. 3. The cutout switch 25 illustrated in FIG. 1 is particularly suited for use on a Volkswagen with a manual transmission utilizing a clutch 26. This species of the invention is also particularly valuable for use with a Corvair with a manual transmission, or any other vehicle having a foot operated clutch. The warning device and theft alarm utilizing the on off toggle switch 37 may be placed in the system schematically in the position of cutout switch 25. Or in the event the theft alarm aspect of the device is to be emphasized, a push button type switch 38 illustrated in FIG. 3 can be concealed and operated by the ash tray (not shown), mounted in the door so as to cut out when the door is open, or operated by the glove compartment door or the console lid. The cutout switch of FIGS. 2 and 3 adapts the device for use in vehicles equipped with automatic transmissions as well as manual transmission.

The species of the device particularly emphasized in this disclosure suggests use with cars having air cooled engines which can and are severely damaged when a red dash light is not noticed for several seconds or a very few minutes. The system is also valuable to alert the operator of a conventional luxury American vehicle with all automatic features when operating conditions occur which if continued will damage the vehicle. The ancillary benefit as a theft alarm is applicable to all the vehicles having warning lights or an on off sensing device indicating operating conditions comparable to inadequate oil pressure or excessive temperature.

One species of the device has been illustrated suggesting the incorporation of the horn 23 with associated relays and three (3) sensing units. Three (3) types of cutout switches have been illustrated and their use described in some detail. It will be apparent to those skilled in the art that numerous changes may be made in the detailed structure described without departing from the spirit or principal of the invention as defined by the appended claims.

I claim:
1. A vehicle comprising:
   (a) a vehicle warning device including:
      (1) a source of electric potential;
      (2) a multiplicity of motor operating condition sensing units conductively connected to said electric potential and constructed and arranged to complete a contact to ground in response to unsafe motor operating conditions;
      (3) a multiplicity of dash lights conductively connected to and responsive respectively to each said unsafe motor operating condition sensing units;
      (4) a multiplicity of horn relays including a multiplicity of switch contacts conductively connected to and operably responsive to unsafe operating sensing of any one of the said multiplicity of said unsafe motor operating condition sensing units said horn relays also including a multiplicity of corresponding battery contacts connected to said electric potential, and a multiplicity of corresponding horn output contacts;
      (5) a vehicle horn connected to each of the said output contacts of each of said horn relays.
   (b) a foot activated pedal having a depressed and a released position operably associated with a component of said vehicle;
   (c) a pedal actuate cutout switch interrupting the circuit between the source of electric potential and the horn responsive to the movement of said pedal to a depressed position and restoring said circuit upon said pedal resuming the released position.
2. The invention of claim 1 wherein vehicle includes a pedal actuated clutch engaging transmission comprising:
   (a) a vehicular transmission; and,
   (b) a clutch disengaging pedal constructed and arranged to inactivate said transmission in a depressed position and activate in a released position.
3. The invention of claim 1 including an above ground wiring harness conductively connecting each of said components of said combination constructed and arranged to activate said horn upon grounding of any portion of said wiring harness of said interconnected components.
4. A vehicle warning device for use in combination with an internal combustion engine comprising:
   (a) a source of electric potential with one pole connected to ground;
   (b) a multiplicity of motor operating condition sensing units constructed and arranged to be opened to ground in a safe operating condition;
   (c) a multiplicity of dash light signal devices conductively connected to said source of electric potential;
   (d) a horn conductively connected to said source of electric potential;
   (e) a multiplicity of corresponding horn relays conductively connected to said source of electric potential, each relay conductively connected to a corresponding sensing unit and a corresponding dash light, and
   (f) an above ground wiring harness conductively connecting each of said components of said combination constructed and arranged to activate said horn upon grounding of any portion of said wiring harness or any of the said interconnected components.

5. The invention of claim 4 including a manually activated cutout switch conductively interposed above ground between said source of electric potential and said horn.

6. The invention of claim 4 wherein said manually activated cutout switch is a pedal activated switch.

7. The invention of claim 4 wherein said manually activated cutout switch is a clutch pedal activated cutout switch.

References Cited

UNITED STATES PATENTS 2,994,073   7/1961   Pelovitz.
3,431,555   3/1969   Leone _____ 340—60

ALVIN H. WARING, Primary Examiner

U.S. Cl. X.R.

340—63; 307—10